United States Patent [19]

Burns

[11] Patent Number: 5,220,584
[45] Date of Patent: Jun. 15, 1993

[54] SYSTEM FOR DEMODULATION AND SYNCHRONIZING MULTIPLE TONE WAVEFORMS

[75] Inventor: Joseph R. Burns, Pennington, N.J.

[73] Assignee: Mikros Systems Corp., Princeton, N.J.

[21] Appl. No.: 633,211

[22] Filed: Dec. 21, 1990

[51] Int. Cl.$^5$ .......................... H04B 7/01; H04L 7/06
[52] U.S. Cl. ........................................ 375/94; 375/97; 375/113
[58] Field of Search .................. 375/75, 77, 94, 97, 375/110, 113; 455/46, 47, 71, 313, 323, 303, 304; 329/336, 356, 363; 371/47.1

[56] References Cited

U.S. PATENT DOCUMENTS

| | | | |
|---|---|---|---|
| 2,849,605 | 8/1958 | Fickett et al. | 455/71 |
| 3,593,256 | 7/1971 | Gannon | 455/71 |
| 3,842,399 | 10/1974 | Kneuer et al. | 375/110 |
| 4,076,956 | 2/1978 | Dogliotti | 375/83 |
| 4,199,809 | 4/1980 | Pasahow | 364/200 |
| 4,276,650 | 6/1981 | deJager et al. | 375/110 |
| 4,493,093 | 1/1985 | Veillard | 375/110 |
| 4,627,080 | 12/1986 | Debus, Jr. | 375/110 |
| 4,707,839 | 11/1987 | Andren et al. | 375/1 |
| 4,719,468 | 1/1988 | Jehle et al. | 342/201 |
| 4,875,050 | 10/1989 | Rathi | 342/195 |
| 4,876,546 | 10/1989 | Koerner | 342/15 |

OTHER PUBLICATIONS

Military Standard, Mil-Std-188-203-1A entitled Interoperability and Performance Standards for Tactical Digital Information Link (TADIL)A, Jan. 8, 1988, U.S. Department of Defense.

*Primary Examiner*—Benedict V. Safourek
*Attorney, Agent, or Firm*—Mathews, Woodbridge & Collins

[57] ABSTRACT

A multiple tone signal is demodulated and synchronization is obtained by precisely locating frame boundaries in order to ensure reliable communication in the presence of anomalies such as Doppler shift, multipath propagation, and additive electronic noise. One such signal, TADIL-A or Link-11, employs multiple tone audio waveforms that are used to modulate RF carriers for the transmission of digital data. Initially, the signal is frequency divided and classified to determine if the incoming frame is a preamble, data or noise. For preamble frames, a digital filter is used to extract the 605 Hz tone in the time domain, and the resulting real-valued signal is passed through a first Hilbert transform to generate the corresponding imaginary complex-valued signal. Unfiltered data frames are passed through a second Hilbert transform and the output is multiplied by the complex conjugate of the stored Doppler reference signal to produce a Link-11 Signal stripped of Doppler. As a result of the demodulation process, the entire waveform now includes frequencies separated by an integer multiple of 110 Hz. Therefore, the composite waveform has a period of 9.09 milliseconds. The composite waveform partially repeats itself at least once in each 13.33 msec frame interval. Using this property, it is possible to determine the location at which the composite signal becomes discontinuous and thereby locate the synchronization frame boundaries.

22 Claims, 7 Drawing Sheets

MODULATION VECTOR DIAGRAM

ROLL CALL TRANSMISSION FORMAT

DEMODULATION AND DOPPLER STRIPPING

DOPPLER POWER FALL OFF

8 POLE FIR DOPPLER FILTER 28

PREAMBLE SYNC TRANSITION

SYSTEM FOR DEMODULATION AND SYNCHRONIZING MULTIPLE TONE WAVEFORMS

GOVERNMENT RIGHTS

This invention was made with Government support under Subcontract JHU/APL 605026-S under Prime Contract No. N00039-89-5301 awarded by the U.S. Department of the Navy. The Government has certain rights in this invention.

BACKGROUND OF THE INVENTION

1. Field of the Invention

The invention relates to a system for demodulating a multiple tone Link-11 Signal, stripping of the Doppler component and locating the synchronization frame boundaries.

2. Background of the Invention

It is important to maintain continuous secure communication over a computer-to-computer radio link during military operations. Typically, a base Net Control Station (NCS), located on an aircraft carrier, keeps in constant contact with moving aircraft or surface vessels referred to as pickets or Participating Units (PU's). As the PU move towards and away from the aircraft carrier, Doppler shifts and other aberrations may be introduced. Various prior art devices and methods have been proposed to overcome these problems.

The standards for communications in the United States Navy over a computer-to-computer radio data link are set forth in military standard MIL-STD-188-203-1A dated Jan. 8, 1988 and entitled "INTEROPERABILITY AND PERFORMANCE STANDARDS FOR TACTICAL DIGITAL INFORMATION LINK (TADIL)A" otherwise known as Link-11. A useful discussion of prior art technology and difficulties is also set forth in U.S. Pat. No. 4,199,809.

A Link-11 data message consists of 48 binary digits. The bits are assembled in two frames, each of 24 bits. Six Hamming code parity check bits are added in each frame to make 30 bits for transmission. Each of the 15 pairs of bits in the frame are converted into a phase shift, with shifts of $-45°$, $-135°$, $-225°$ and $-315°$ representing 4 bit pairs, namely (1,1), (0,1), (0,0) and (1,0). Differential Quadrature Phase Shift Keying (DQPSK) is applied to each of 15 audio tones. 14 of the tones are at frequencies of 935 Hz through 2,365 Hz at 110 Hz intervals, with a 15th tone at 2,915 Hz. The transmitted audio signal is the sum of the 15 modulated signals plus a Doppler reference tone of 605 Hz. Therefore, the signal consists of 16 superimposed sine waves, with nominal frequencies given by the tone library of 605, 935, 1045, 1155, 1265, 1375, 1485, 1595, 1705, 1815, 1925, 2035, 2145, 2255, 2365, and 2915 Hz. It is important to note that all of the 16 frequencies are separated from each other by 110 Hz or an integer multiple thereof. The Doppler reference tone of 605 Hz is used for Doppler shift corrections.

The transmitter at the NCS uses the audio signal to amplitude modulate an HF radio frequency carrier and transmit a double sideband suppressed carrier HF signal. Each of the two sidebands, the upper and the lower, contain the same audio signal upon transmission, but anomalies in the propagation path, noise, and interference may cause the received sidebands to differ.

Each Link-11 message is made up of a preamble consisting of five frames which contain only 605 Hz and 2915 Hz tones, followed by an arbitrary number of data frames containing all 16 tones. During the five frame preamble, the 2915 Hz tone is given twice its normal amplitude and is phase shifted 180° at each frame boundary to provide for frame synchronization. The 605 Hz tone is given twice the amplitude of the 2915 Hz tone during the preamble frames and twice the amplitude of the information carrying tones for all other transmitted frames. The 6th frame is a reference frame during which all data tones are transmitted to establish a reference phase for each. Frame positions 7 and 8 provide a start code control signal indicating that data will follow. After the data is transmitted, a picket stop code control signal is transmitted to complete the message.

Link-11 signals are divided into fixed-length frames having a duration of 13.33 msec (fast) or 22 msec (slow), at the operator's option. Within individual frames, each tone has a fixed phase. With the exception of the 605 Hz tone, which is unmodulated and used for Doppler correction, the phase of each tone changes at each frame boundary. At the fast speed of 13.33 msec, the throughput is 2250 bits per second or 47 bits per frame.

Differential Quadrature Phase Shift Keying (DQPSK) is used to encode data, so that the phase change of each tone at the frame boundary encodes a 2-bit value depending upon the quadrant in which the differential phase value occurs.

The protocol of Link-11 includes 5 modes of operation namely, Roll Call, Net Sync, Net Test, Broadcast and Short Broadcast. Further discussion of the protocol may be found in military standard. MIL-STD-188-203-1A referred to previously.

As described in military standard MIL-STD-188-203-1A, the multi-tone Link-11 waveform is usually transmitted over the HF band (2–30 MHz) or the UHF band (200–400 MHz). In the case of UHF, the waveform frequency modulates the carrier (FM) while at HF the modulation is single side band AM (SSB). In the latter case, a frequency shift of the carrier due either to relative motion induced Doppler shift or relative miss-tuning of the transmitter with respect to the receiver, results in a uniform translation of all frequency components of the audio waveform. See, in particular, Sections 5.1.1 and 5.1.2 of military standard MIL-STD-188-203-1A. Regardless of its physical causes, this uniform frequency shift is generally referred to as "Doppler shift." Therefore, with respect to a conventional multiple tone Link-11 waveform, this means that all 16 tones, including the unmodulated 605 Hz Doppler reference tone and the 15 phase modulated data tone (935 to 2915 Hz) will all undergo an identical uniform frequency shift, $f_{DP}$. For further discussion, see sections 5.1.10 and 5.2.7 of military standard MIL-STD-188-203-1A. The aforementioned shift $f_{DP}$, which can be as great as $+$ or $-75$ Hz, affects the entire signal and must be removed or large data errors will occur.

The patent literature describes the difficulties with earlier approaches. In particular, U.S. Pat. No. 4,199,809 describes clearly how the prior art hardware equipment is highly customized and difficult to maintain. The size of prior art Link-11 systems is relatively large and generally requires chilled water cooling. Changes to equipment are difficult to implement and costly to obtain.

The use of Hilbert transforms in the context of a Link-11 system is discussed in U.S. Pat. No. 4,076,956.

Other U.S. Patents relating to the correction of Doppler shift in the context of Picket systems include U.S. Pat. Nos. 4,719,468; 4,875,050 and 4,876,546.

Phase correction is also a problem in Link-11 systems and is discussed along with Fast Fourier Transforms (FFT), and frame boundary sync detection in U.S. Pat. No. 4,199,809. Phase correction in a quadrature-like phase shift signal is discussed in U.S. Pat. No. 4,707,839.

The invention arose in the context of the above-described prior art.

SUMMARY OF THE INVENTION

Briefly described, the invention comprises a system including a method and apparatus for detecting synchronization frame boundaries in a Link-11 signal that has been demodulated and Doppler stripped. The incoming Link-11 composite signal at 14,080 Hz is initially frequency divided to 7,040 Hz and classified to determine if it is a preamble or data segment or noise. For preamble frames, a digital filter extracts the 605 Hz Doppler tone in the time domain plus the Doppler shift, and the resulting real-valued signal is passed through a first Hilbert transform to generate a complex-valued signal. The output of the first Hilbert transform contains a measure of the Doppler shift and is stored for later use in processing data frames. The date frames are also passed through a second Hilbert transform and the output is multiplied by the complex conjugate of the stored Doppler reference signal to produce a Link-11 signal stripped of Doppler. The signal is then passed through a 32-point FFT to transform it into frequency space. The phase values outputted from the FFT are then corrected to account for frame-to-frame delay. Phase differences between the current and previous frames determine the dibit values for the encoded digital data.

At the fast rate of 2250 bits per second, each data frame interval is 13.33 msec. Since the difference between each of the 16 tones in the tone library is 110 Hz, or an integer multiple thereof, the composite complex waveform begins to repeat itself in a periodic manner 9.09 msec into the 13.3 msec frame (9.09 msec equals 1/110 Hz). Therefore, for the remaining approximately 4.24 msec of the frame, the composite signal is identical to the first 4.24 msec of the same frame. If the first 4.24 msec of the frame are subtracted from the last 4.24 msec of the frame, the outcome is substantially zero and can be represented by the following difference function $$D = S(m+32) - S(m)$$

where m equals the number of samples. According to the preferred embodiment, there are 47 samples in the entire frame and in the first 9.09 seconds 32 samples are taken. Since the composite signal repeats during the last 15 bits (i.e. 4.24 msec) of the frame, the function $D = S(m+32) - S(m)$ will be substantially zero until the beginning of the next frame boundary at which point all the tones in the tone library change phase with the exception of the continuous 605 Hz Doppler reference signal. This produces a very strong discontinuity in the function $D = S(m+32) - S(m)$, thereby indicating the beginning of a new frame.

The foregoing technique for demodulation and synchronization is faster and less expensive than other techniques known to date.

DESCRIPTION OF THE PREFERRED EMBODIMENT

During the course of this description, like numbers will be used to identify like elements according to the different figures that illustrate the invention.

Figure 1:
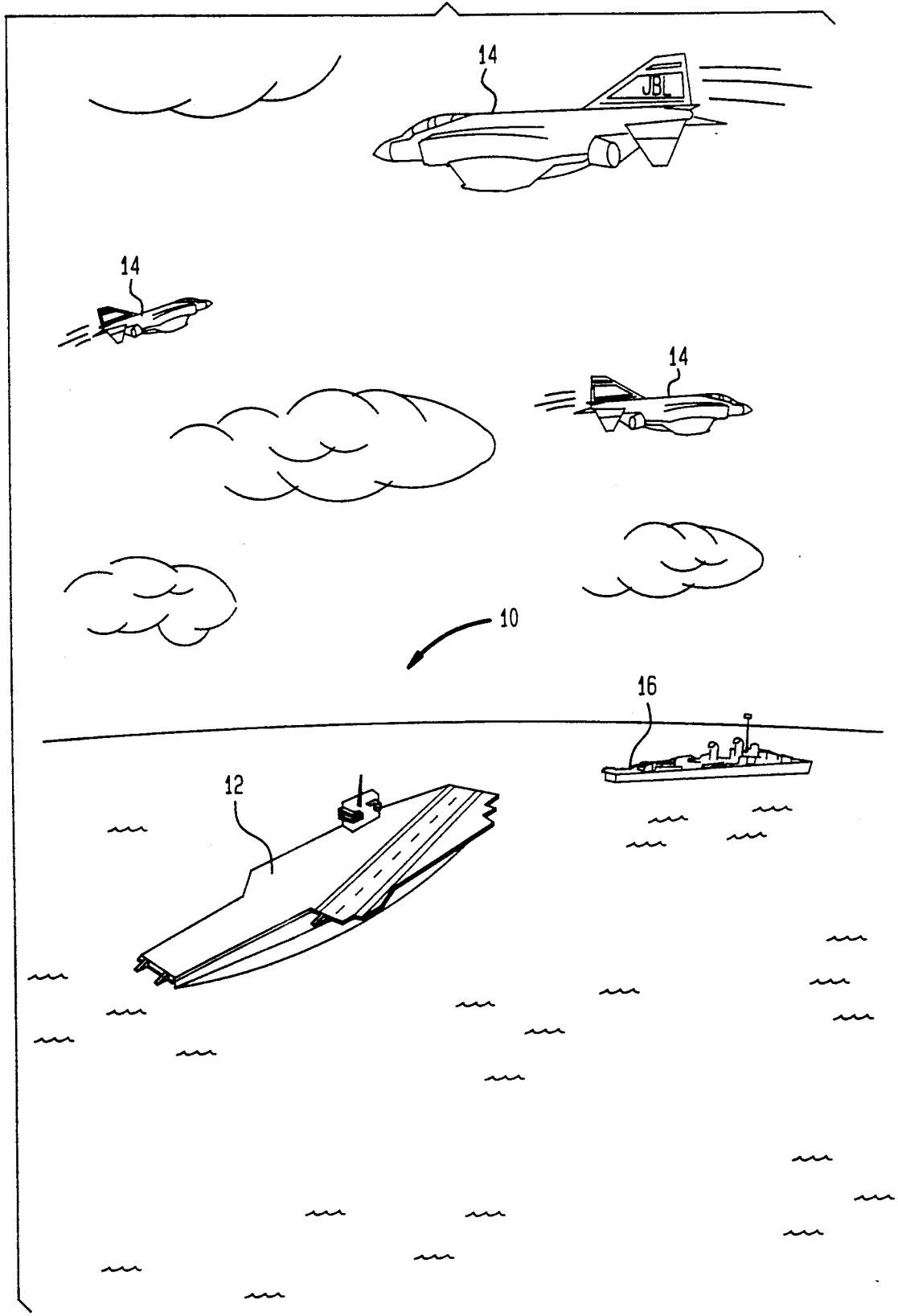
FIG. 1 illustrates a naval battle group including a Link-11 system in which an aircraft carrier acts as the Net Control Station (NCS) and is surrounding aircraft and surface vessels operating as pickets or PU's.

A Navy battle group 10 employing a Link-11 system is illustrated in FIG. 1. An aircraft carrier 12 typically acts as the Net Control Station (NCS) and is in continuous contact with aircraft 14 or surface vessels 16 (referred to collectively as Participating Units (PU's)). Because of the high relative speeds of the Picket aircraft 14 with respect to the Net Control Station 12, undesirable phase and Doppler shifts are often introduced into the computer-to-computer radio Link-11 signals.

Figure 2A:
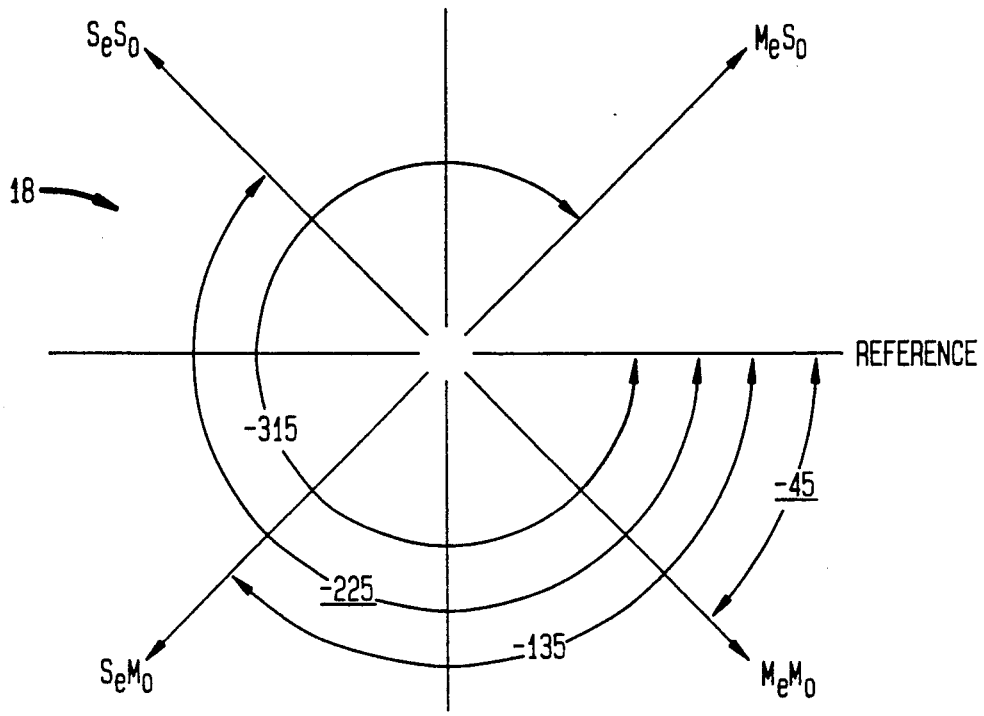
FIG. 2A is a prior art diagram illustrating the 4 phase shift locations representing the 4 data bit pairs.

A typical prior art Link-11 signal S 18 is generated according to the procedure shown in the modulation vector diagram of FIG. 2A. As described in the Background of the Invention, each of the 15 pairs of bits in each data frame are converted into a phase shift, with shifts of $-45°$, $-135°$, $-225°$ and $-315°$ representing bits pairs (1,1), (0,1), (0,0), and (1,0). Differential Quadrature Phase Shift Keying (DQPSK) is applied to each of the 15 tones. The 15 tones $f_n$ plus the 605 Hz Doppler reference signal (f) comprise a 16 tone library consisting of the frequencies of $f_n = 605$, 935, 1045, 1155, 1265, 1375, 1485, 1595, 1705, 1815, 1925, 2035, 2145, 2255, 2365 and 2915 Hz. Each of the nominal frequency tones $f_n$ is separated from the other by 110 Hz or an integer multiple thereof.

Each data frame is encoded with a 30 bit digital data value at an aggregate data rate of 2250 bits per second at a frame interval of 13.33 msec (fast speed).

Figure 2B:
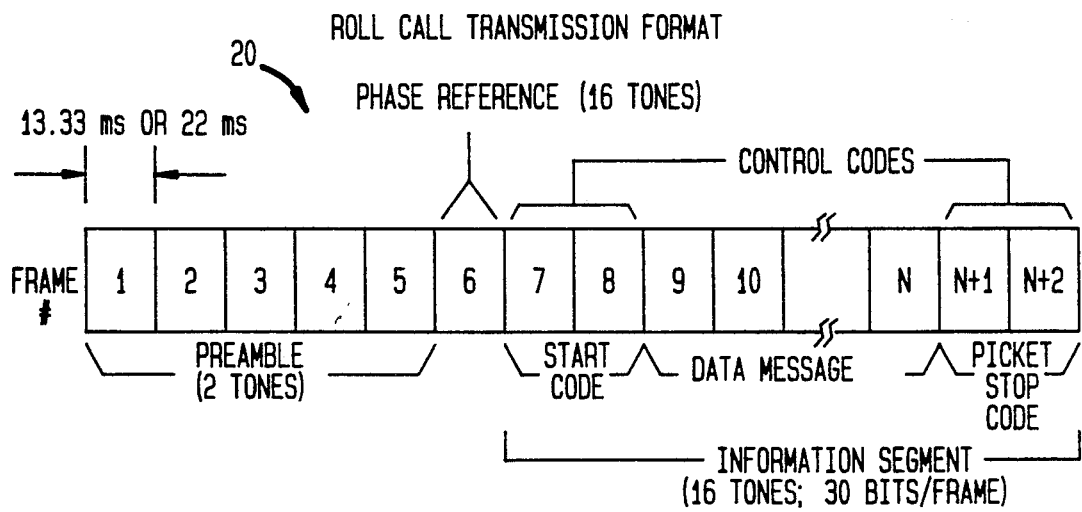
FIG. 2B illustrates a typical prior art Link-11 message consisting of a plurality of 13.33 msec frames 1 through n+2.

The format of a typical prior art Link-11 Signal S is illustrated in FIG. 2B. The first five frames of a Link-11 message S consist of only the 605 Hz Doppler correction tone $f_{DR}$ and the 2915 Hz framing tone. The 2915 Hz framing tone is given twice its normal amplitude and is phase shifted 180° at each frame boundary $F_{Bl}$ to provide for frame synchronization. The 605 Hz tone is given twice the amplitude of the 2915 Hz tone during the preamble frames and twice the amplitude of the information carrying tones $f_n$ on all other transmitted frequencies. The information may be transmitted at a slow 22 msec speed or a fast 13.33 msec speed. The fast 13.33 msec speed is used for purposes of illustration in this disclosure.

The five frame preamble is followed by a 6th reference frame during which all the 16 tones are transmitted to establish a reference phase for each tone.

The information segment starts with frame 7 and ends with as many frames as is necessary to complete the message (n+2). Frames 7 and 8 each comprise a start code and the actual data begins with frame 9. The transmission is completed with a picket stop code in the n, n+1 and n+2 frames. During the information segment all 16 tones are present producing 30 bits of information per frame.

The foregoing describes a basic, prior art Link-11 system which is described in further detail in Military Standard MIL-STD-188-203-1A.

Figure 3:
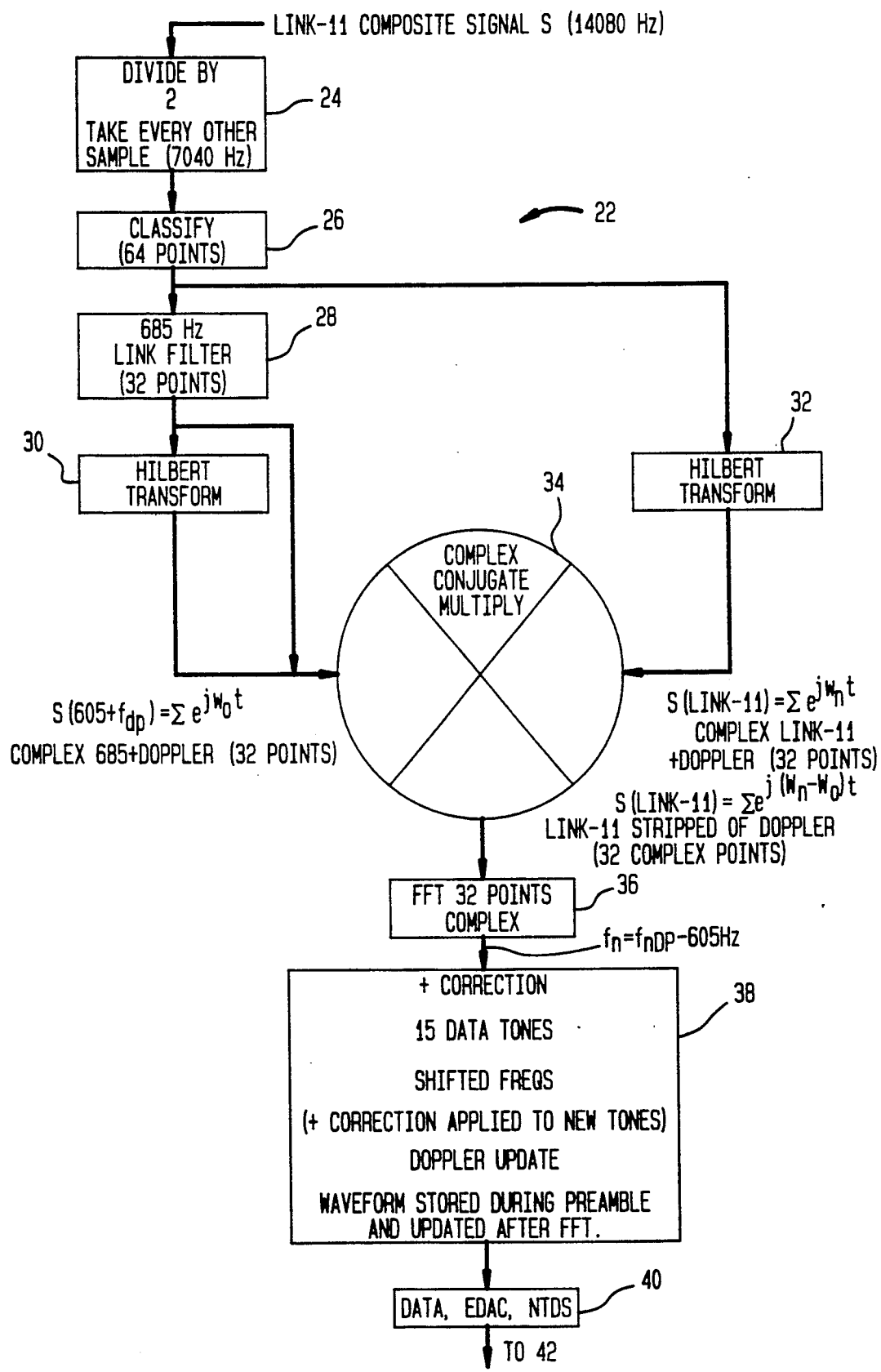
FIG. 3 is a block diagram illustrating the system according to the preferred embodiment of the invention for demodulating the Link-11 signal and stripping the Doppler component therefrom.

The demodulation system according to the preferred embodiment is illustrated in FIG. 3. The demodulation system 22 begins with the 14,080 Hz Link-11 composite signal and divides it by frequency divider 24 to reduce it to a 7040 Hz signal S.

Figure 5:
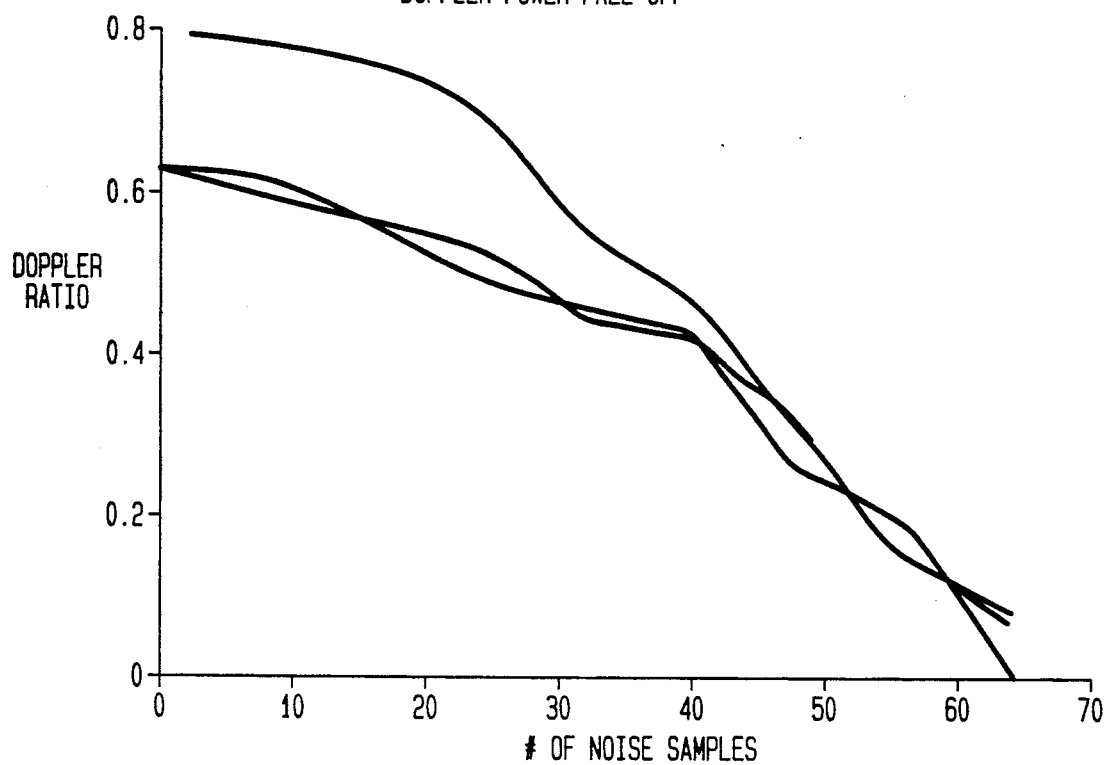
FIG. 5 illustrates the fall off of Doppler power in proportion to the number of noise samples taken.

The next step is to classify the signal to determine if a valid signal is present. If 64 samples are examined, do the previous 64 samples consist of pure noise, mixed noise and signal, or all signal? The first step in the classification process is to determine if there is any Link-11 component present at all in the signal. To make this determination a 64 point windowed Fast Fourier Transform (FFT) is performed on the data and the ratios of the 605 Hz power to total power is determined as a function of the number of noise samples in the set. The results are shown in the graph of FIG. 5 for Doppler shifts $f_{DP}$ of zero and plus or minus 75 Hz. Note, for a Doppler frequency of 0 (f=0) and no noise samples, the ratio is 0.8, the nominal value for a Link-11 preamble. There is an ambiguity, however, in this ratio since a signal with a large Doppler shift ($f_{DP}$=large) can produce the same ratio as signals with no Doppler shift ($f_{DP}$=0) and a large number of noise samples. This conflict is resolved by taking the following steps:

1. Introduce a 75 Hz interrupt.
2. Provide a windowed FFT and form the Doppler ratio of $R_D$.
3. If $R_D$ is less than 0.4 ($R_D$<0.4), reject the data, and go back to step 1 for the next interrupt.
4. If R is greater than 0.4 ($R_D$>0.4), set the valid signal flag VS=1.
5. Introduce 75 Hz interrupt if VS=1 and accept the previous 64 samples.

The valid signal VS=1 indicates that there is at least a partial signal in the current frame. The next 75 Hz interrupt that occurs 94 samples later is then guaranteed to contain completely valid data regardless of noise or Doppler shift. Signal Classification takes place in Classify unit 26 and is based upon a power spectrum analysis on a 64 point windowed FFT (disguised as 32 point complex FFT) over a −75 Hz to +75 Hz Doppler shift. Once it has been determined that a Link-11 signal is present, the second step in the classification process is to determine if the Link-11 signal is preamble, data or both. That determination is made as follows:

1. Assign 605 Hz BIN — $M5, M6$
   Assign 935 Hz BIN — $M9, M10$
   Assign 2915 Hz BIN — $M25, M26, M27, M28$ 2. $\frac{MAG \wedge 2 \ (2915 \ BIN)}{MAG \wedge 2 \ (605)} \geq .25(.15 \rightarrow .3)$
   SIGNAL PRESENT 3. $\frac{MAG \wedge 2 \ (935 \ BIN)}{MAG \wedge 2 \ (605 \ BIN)} < 0.50$
   PREAMBLE OR DATA FRAME 4. $\frac{M25 + M28}{M26 + M27} > .5$
   PREAMBLE WITH FRAME BOUNDARY If we call the sample no. $S\phi$, 64 points back from the pointer value at the time of the last interrupt, then, in the through $S\phi$ through $S\phi+50$, there must be at least one frame boundary at a sampling rate of 7040 Hz.

Figure 6:
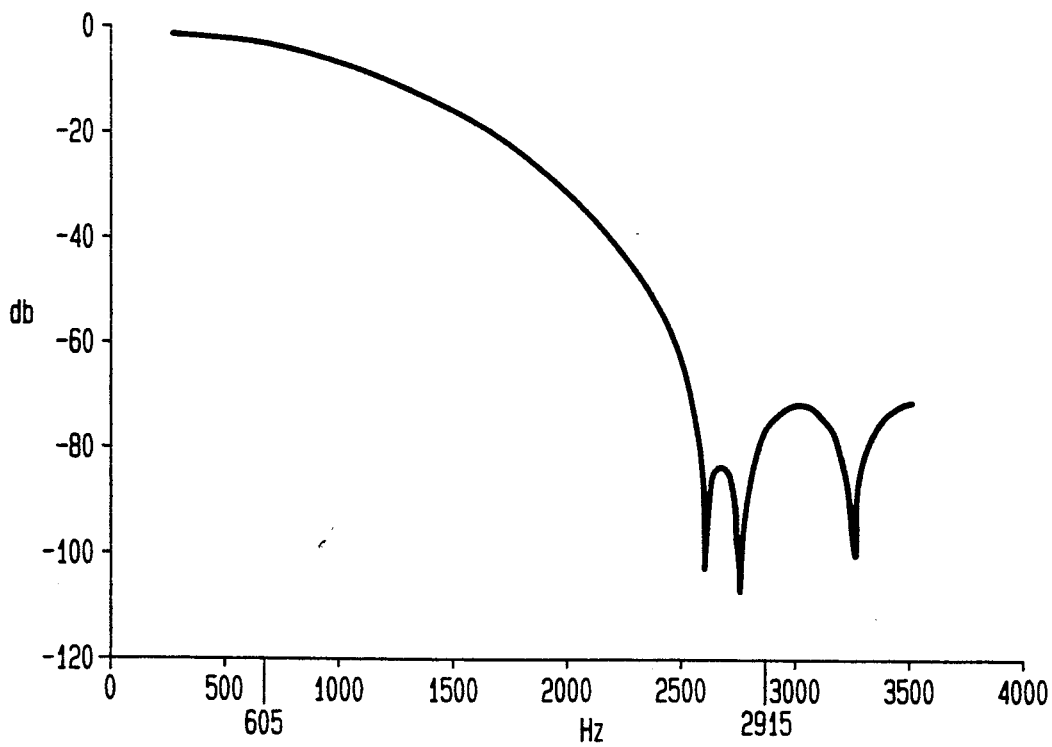
FIG. 6 illustrates the characteristics of the low pass digital filter of FIG. 3.

Once the signal is classified in Classify unit 26, it is then passed to the low pass digital filter 28, where the Doppler reference frequency $f_{DR}$ of a Link-11 system is always 605 Hz. The characteristics of digital filter 28 are illustrated in FIG. 6. The preferred embodiment is an eight tap FIR (Finite Impulse Response) digital filter which passes the 605 Hz signal plus or minus the 75 Hz Doppler shift $f_{DP}$ but which provides approximately 70 dB attenuation for the 2915 Hz signal. Therefore, the 605 Hz plus or minus 75 Hz (i.e. 530 Hz to 680 Hz range) signal is easily passed but all other signals are generally rejected. This produces a real signal having the form of $$R = \cos \ (2\pi \ [605 + f_{DP}] \ t).$$

The resulting output from digital low pass filter 28 provides an input to a first Hilbert transform 30 which produces the imaginary portion of the signal in the form $$I = \sin \ (2\pi \ [605 + f_{DP}] \ t).$$

Figure 7A:
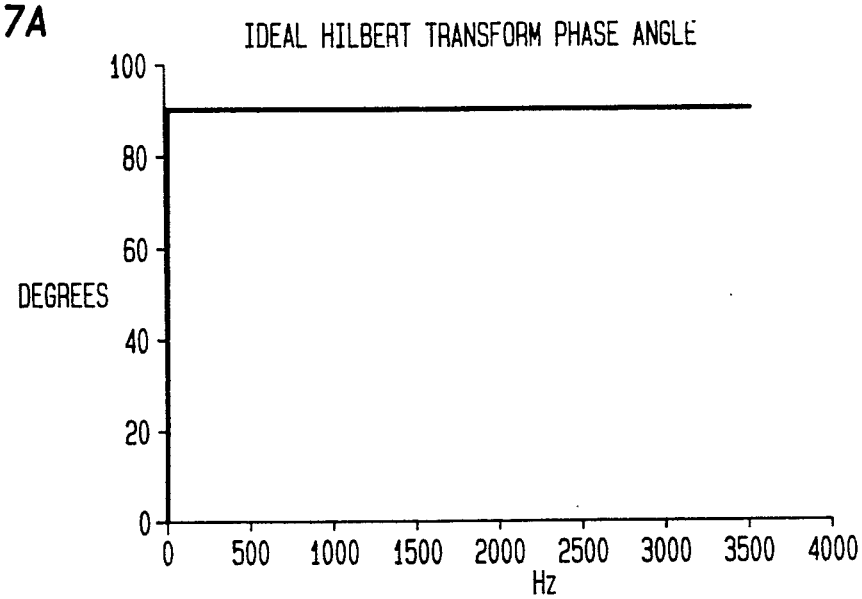
FIG. 7A illustrates the all pass 90° phase shift characteristics of an ideal Hilbert transform.

The ideal characteristics of a Hilbert transform are illustrated in FIG. 7A. The purpose of a Hilbert transform is to provide an all pass 90° phase shift so as to produce the imaginary portion of the complex signal. Since the signals only range in frequency from 530 Hz (605 Hz−75 Hz=530 Hz) to 2915 Hz, any signal above approximately 3500 Hz is irrelevant. Therefore, even though the ideal Hilbert transform acts like an all pass 90° phase shift filter, for all intents and purposes, it is only important that the Hilbert transform exhibit that characteristic from between approximately 600 Hz and 3000 Hz.

Figure 7B:
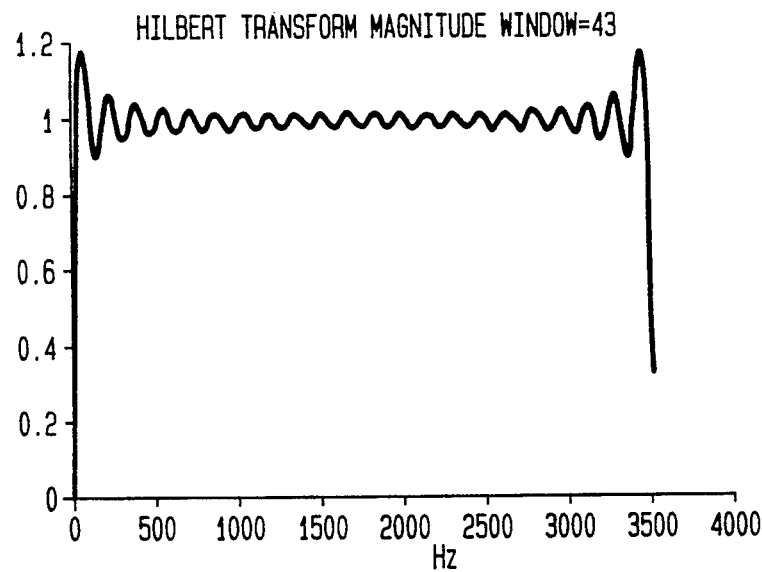
FIG. 7B illustrates the all pass characteristics of a Hilbert transform having a window of 43 samples.
Figure 7C:
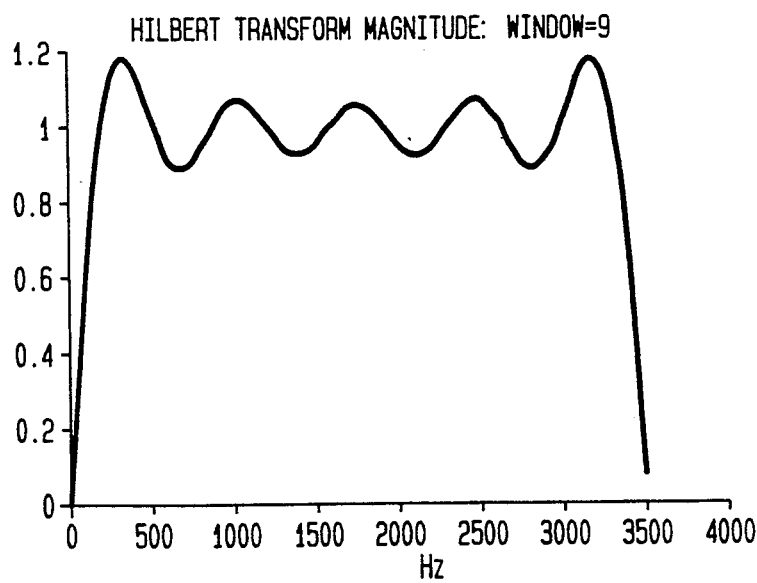
FIG. 7C illustrates the all pass, 90° phase shift characteristics of the preferred embodiment of the Hilbert transform shown in FIG. 3 having a window of 9 samples.

The accuracy of the Hilbert transformation 30 depends upon the number of samples in the window chosen. If the window sample rate is fairly high, then the accuracy is also high. FIG. 7B illustrates the condition where the window has 43 samples (W=43). Unfortunately, the larger the number of samples the longer the process takes. Accordingly, it has been found that a sample rate of 9 (W=9) is generally satisfactory to produce the approximate 90° phase shift over the frequency range of 600 Hz to 3000 Hz. FIG. 7C illustrates the Hilbert transform characteristic according to the preferred embodiment of Hilbert transforms 30 and 32 where the sample rate for the window is W=9.

The digital technique for forming a Hilbert transform is known and is determined by the following discrete approximation:

$$Y(T) = \text{SUM}\left(\frac{2}{\pi}\left(\frac{X(T-n) - X(T+n)}{n}\right)\right)$$

Y(T) = a complex signal having the form
Y(T) = X + jY; and,
nMAX = W = window size which determines the accuracy of the transform.

The real portion of the signal R from digital filter 28 and the imaginary portion of the signal I from first Hilbert transform 30 are combined and fed into complex multiply 34. The complex signal has the following form:

$$S(W_o) = R + jI = \cos(2\pi[605 + f_{DP}]t) + j\sin(2\pi[605 + f_{DP}]t)$$

which can also be expressed in the following way:

$$S(w_o) = \Sigma e^{jw_o t} \text{ where } w_o = 2\pi(605 + f_{DP}).$$

The above expression consists of the passed 605 Hz complex signal with a Doppler frequency component $f_{DP}$.

The other input to the complex multiply 34 comes from a second Hilbert transform 32. The characteristics of the second Hilbert transform 32 are the same as the characteristics of the first Hilbert transform 30 and are shown generally in FIGS. 7C. Since the input to second Hilbert transform 32 is not filtered by the low pass digital filter 28, the output will comprise a complex signal including all of the 16 tones in the Link-11 library plus the Doppler signal (f) and will have the general form of $$S(w_{nd}) = \cos(2\pi[f_n + f_{DP}]t) + j\sin(2\pi[f_n + f_{DP}]t)$$

or $$S(w_{nd}) = \Sigma e^{jw_{nd}t}$$

The foregoing expression can be further simplified to the following $$S(w_{nd}) = \Sigma e^{jw_{nd}t}$$

where
$w_{nd} = 2\pi(f_n + f_{DP})$, and
$f = 605 + f_{DP}, 935 + f_{DP}, \ldots, 2915 + f_{DP}$ The output from digital filter 28 and first Hilbert transform 30 has previously been stored in memory in the form of $$S(w_o) = \Sigma e^{jw_o t}$$

wherein
$w_o = 2\pi(605 + f_{DP})$.

The complex multiply 34 multiplies the complex conjugate of the output from filter 28 and first Hilbert transform 30 (S(w_o)) by the output from second Hilbert transform 32 (S(w_{nd})). The multiplying by a complex conjugate implies the changing of the expression j to −j Therefore, the new Link-11 signal S (Link-11)

$$= \Sigma e^{jw_{nd}t} e^{-jw_o t} = \Sigma e^{j(w_{nd} - w_o)t}$$

The foregoing has the effect of subtracting from every tone the Doppler frequency shift f wherein f is also expressed as follows:

$$f_{DP} = f_c \frac{V_r}{C}$$

where
$f_c$ = carrier frequency
$V_r$ = platform speed
C = speed of light
There is often an additional Doppler component due to the mistuning of transmitter and receiver.

The affect of the foregoing is that the Doppler shift $f_{DP}$ can be stripped from the Link-11 signal S(n) without even knowing what the Doppler shift is. This is a distinct advantage over prior art techniques which require the identification of the exact Doppler shift and the subsequent subtraction thereof. The real time Doppler stripping technique described herein is a much faster and more efficient way of stripping Doppler signals than was available by prior art techniques.

The sampling rate of the signal is important. General sampling theory suggests that for a given maximum frequency B, the sampling frequency $F_S$ should be greater than 2B which is expressed by the equation:

$$F_S < 2B$$

According to the present invention, however, it is only necessary to sample a complex signal S at a rate wherein $F_S$ is greater than B, or $$F_S < B$$

This sampling rate for a Link-11 Signal S considerably reduces the signal processing time by operating on just half the number of samples throughout (i.e. $F_S = 3520$ Hz). Accordingly, the execution time, per sideband, is significantly faster than the prior art.

The Link-11 signal S stripped of its Doppler component is fed from the complex conjugate multiplier 34 into a 32 point Fast Fourier Transform (FFT) analyzer which reconstructs the original 16 tone library from the data signals and produces 16 outputs all corrected for Doppler shift and in the form of $$f_n = f_{nDP} - 605 \text{ Hz}$$

where
$f_{nDP}$ = Doppler shifted $f_n$

The output from the FFT unit 36 is fed as an input to the correction unit 38. At this location, phase correction is applied to the 15 data tones along with the appropriate Doppler update. Prior to this time, the waveform stored during the preamble phase is updated and outputted to a variety of locations indicated by element 40 for further analysis and utilization. For example, conventional Error Data and Correction codes (EDAC) may be appropriate at this point.

The Doppler shift $f_{DP}$ can be updated in the following manner. The Doppler shift may slew at rates of up to 3.5 Hz/second. The variation may be slow but can build up large phase errors over a long message. Therefore, it is useful to measure the Doppler error by observing differential phase shift in the DC BIN (605 Hz 1.65° per Hz shift). Periodically (e.g., every 15 frames), it is useful to premultiply the complex time domain signal by the conjugate of the observed error.

The operation of the demodulation and Doppler stripping system of FIG. 3 can be summarized as follows. The incoming signal S is frequency divided from 14,080 to 7,040 Hz. The preamble frames of a message are processed separately from the data frames, so that the CLASSIFY technique of unit 26 first decides whether an incoming frame is a preamble or data based upon the 32-point windowed FFT, which gives the tone power values for each frequency $f_n$. For preamble frames, the low pass digital filter 28 is used to extract the 605 Hz tone in the time domain, and the resulting real valued signal R is passed through the first Hilbert transform 30 to generate the corresponding complex-valued signal. The output of the first Hilbert transform contains a measure of the Doppler shift $f_{DP}$ and is stored for later use in processing data frames. Unfiltered data frames are also passed through the second Hilbert transform 32 and the output $S(w_o)$ is multiplied by the complex conjugate of the stored Doppler reference signal in unit 34 to transform it to frequency space. The phase values S outputted from the FFT 36 are then corrected in unit 38 to account for frame-to-frame delays, the phase differences between the current and previous frames. The dibit values are then determined for the encoded digital data in unit 40.

One problem still remains with the periodic signal S produced at step 40 as illustrated in FIG. 3, namely that the precise initial frame sync boundaries $F_{Bl}$ have not been located. The location of frame boundaries is important because signals that straddle frame boundaries produce large and intolerable bit errors. Therefore, it is desirable to precisely identify initial frame boundary sync locations so that the performance of the system is not compromised.

Figure 4:
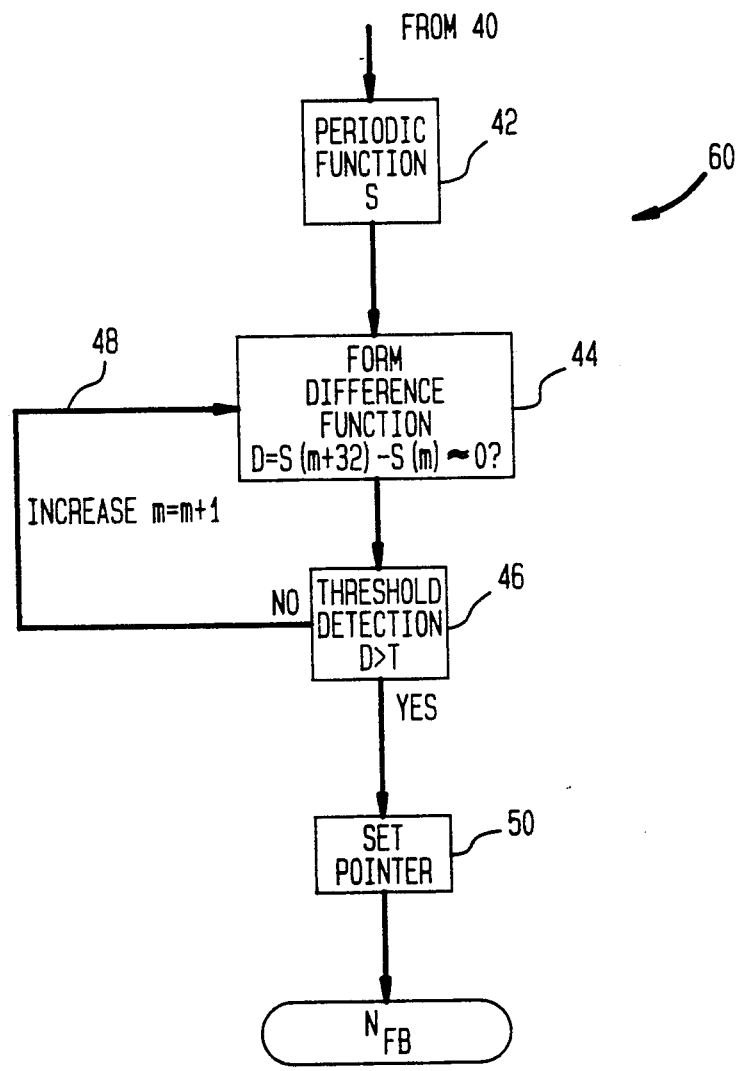
FIG. 4 is a block diagram describing the system for locating the frame boundaries of the Link-11 Signal processed in the manner shown in FIG. 3.

FIG. 4 illustrates the preferred embodiment of the invention for determining frame boundaries $F_{Bl}$ for the purpose of sync detection. The process begins with a periodic function S such as may come from step 40 in FIG. 3 and as illustrated in FIG. 4 as unit 42. The composite waveform S is complex and consists of one complex sample at a 3520 Hz rate. All of the tones $f_n$ are separated by integer multiples of 110 Hz so that the entire waveform is periodic with a period 1/110 Hz=9.09 msec.

Figure 8:
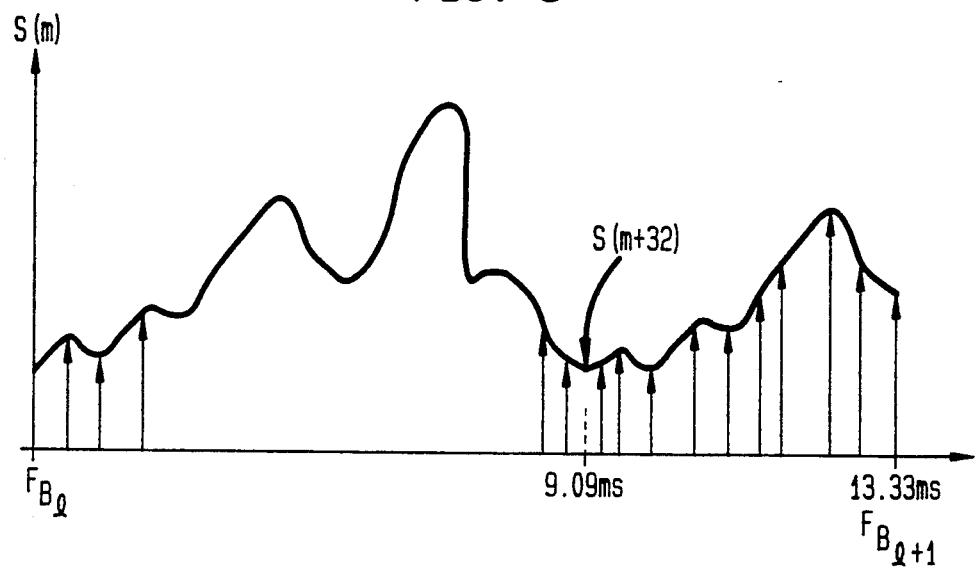
FIG. 8 illustrates how the sampled complex periodic signal S(m) produced by the demodulation and Doppler stripping technique described in FIG. 3 partially repeats itself within a single frame.

A typical sampled signal S(m) is illustrated in FIG. 8. In view of the fact that each frame interval is at the fast rate of 13.33 msec, there is 4.24 msec after the first 9.09 msec where the composite signal S(m) repeats itself. By taking advantage of the partial periodicity of the signal S(m), it is possible to locate the frame boundary $F_{Bl}$. The signal S(m) is fed into the form difference function unit 44 which produces an output D described as follows $$D = S(m+32) - S(m)$$

Figure 9:
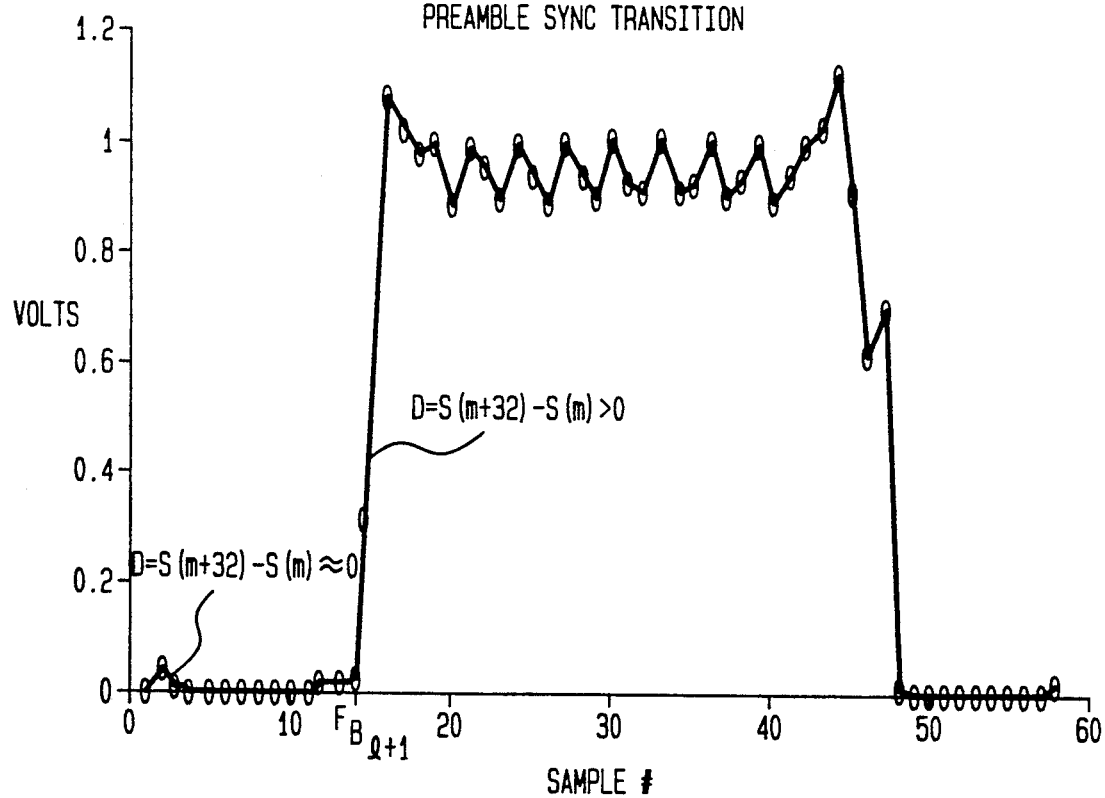
FIG. 9 illustrates how the function $D = S(m+32) - S(m)$ makes a significant change from substantially zero to a larger value at frame boundaries.

The output from difference function unit 44 D is illustrated in FIG. 9. During the period between 9.09 msec and 13.33 msec, the function $D = S(m+32) - S(m)$ will equal zero because the signal S(m) is substantially identical for the periods between 0 and 4.24 msec and 9.09 msec and 13.33 msec.

At the frame boundary $F_{Bl+1}$, 15 of the 16 tones in the 16 tone library will change phase. The result is that the function $D = S(m+32) - S(m)$ will be substantially greater than zero and will exhibit a significant discontinuity. This discontinuity is illustrated in FIG. 9 at the location where the function $$D = S(m+32) - S(m)$$

jumps up to approximately 1. The characteristic of the D transition is dependent upon noise, incoming signal amplitude and the data (phase) values, and is somewhat variable from frame to frame. Therefore, because of the partially periodic nature of S(m), the difference function D is substantially zero until the samples cross over into the next frame $F_{Bl+1}$ where a phase change occurs. A sharp discontinuity here determines the position of the frame boundary $F_{Bl+1}$ from the end of the set of samples used to extract the current frame's data values. The foregoing technique is employed to initially locate frame synchronization boundaries from the information in the preamble frames. A fast continuous synchronization technique is later used to maintain synchronization during data frames.

The initial sync detection technique 60 can be summarized as follows. After Doppler correction, the composite Link-11 Signal S has tones that are separated by integer multiples of 110 Hz, and is periodic every 9.09 msec. Therefore, points within a frame of samples apart will be equal. This equality applies until the phase transition at the frame boundary produces a large discontinuity. The discontinuity is determined by the function $D = S(m+32) - S(m)$ which goes from substantially zero to above a threshold value T at each frame sync boundary $F_{Bl+1}$. A frame boundary pointer or flag is generated when $D = T$.

The demodulation system 22 illustrated in FIG. 3 is a necessary preamble to the frame boundary and sync detection system 60 illustrated in FIG. 4 because the output signal from the demodulation system 22 is a complex periodic signal that lends itself to the frame boundary technique illustrated in FIG. 4.

The preferred embodiment of the invention illustrated in FIGS. 3 and 4 can be implemented in hardware but is preferably performed by a MIL-STD-1750 A microprocessor having instructions which perform the functions illustrated in the block units 24 through 50. The MIL-STD-1750 A microprocessor is a D.O.D. standard which operates with a 16-bit instruction set. No other special hardware is required.

While the invention has been described with reference to the preferred embodiment thereof, it will appreciated by those of ordinary skill in the art that various modifications and changes may be made to the invention without departing from the spirit and scope of the invention as a whole.

I claim:

1. A system for demodulating a multiple tone signal S including a Doppler reference tone $f_{DR}$, a Doppler frequency shift $f_{DP}$ and a plurality of data tones at frequencies $f_n$ transmitted in frames, said system comprising:

a digital filter means for passing $f_{DR}$ and $f_{DP}$ and forming a real signal $R_1 = \cos(2\pi [f_{DR} + f_{DP}] t)$;

first Hilbert transform means connected to said digital filter means for forming from $R_1$ an imaginary signal in the form of $I_1 = \sin (2\pi [f_{DR}+f_{DP}] t)$;

second Hilbert transform means for transforming the real part $R_2$ of $S = \cos (2\pi [f_n+f_{DP}] t)$ into an imaginary signal having the form of $I_2 = \sin (2\pi [f_n+f_{DP}] t)$; and, complex multiply means for multiplying $R_2 + jI_2 = \cos (2\pi [f_n+f_{DP}] t) + j \sin (2\pi [f_n+f_{DP}] t) = \Sigma e^{jwnt}$ by the complex conjugate of $R_1 + jI_1 = \cos (2\pi [f_{DR}+f_{DP}] t) + j \sin (2\pi [f_{DR}+f_{DP}] t) = \Sigma e^{jwot}$, thereby producing the signal $\Sigma e^{j(wn-wo)t}$, wherein the Doppler reference signal $f_{DR}$ and the Doppler frequency shift $f_{DP}$ are stripped from the signal S to produce a periodic signal having the form of $\Sigma e^{7(wn-wo)t}$.

2. The system of claim 1 wherein said digital filter means comprises a low pass digital filter means.

3. The system of claim 2 further comprising:
Fourier Transform means connected to said complex conjugate multiply means for determining the frequencies $f_n$ and phase angles $\phi_n$ present in S.

4. The system of claim 3 further comprising frame boundary determining means including:
function generating means for sampling said signal S a total of m samples per frame and generating a voltage difference function $$D = S(m+x) - S(m) \text{ volts,}$$

wherein x is the sample point where the signal S begins to repeat itself within a single frame;
threshold detecting means for determining when D is greater than a predetermined threshold voltage T, wherein T is substantially greater than zero volts; and,
frame boundary setting means for generating a frame boundary signal when said threshold detecting means detects that the difference voltage D is greater than the threshold voltage T.

5. The system of claim 4 further comprising:
classifying means connected to said digital filter means for receiving said signal S and for determining if a signal containing data is present in said signal S.

6. The system of claim 5 further comprising:
frequency dividing means connected to said classifying means for receiving said signal S and for reducing the frequency of S.

7. The system of claim 6 further comprising:
correction means for correcting the signal from said Fourier Transform means for phase errors.

8. The system of claim 7 wherein said Fourier Transform means comprises a Fast Fourier Transform (FFT) means.

9. A method for demodulating a multiple tone signal S including a Doppler reference tone $f_{DR}$, a Doppler frequency shift $f_{DP}$ and a plurality of data tones at frequencies $f_n$ transmitted in frames, said method comprising the steps of:

digitally filtering said signal S to pass $f_{Dr}$ and $f_{DP}$ and form the real signal $R_1 = \cos (2\pi [f_{DR}+f_{DP}] t)$;

transforming said signal $R_1$ with a first Hilbert transform into an imaginary signal $I_1 = \sin (2\pi [f_{DR}+f_{DP}] t)$;

transforming the real part $R_2$ of $S = \cos (2\pi [f_n+f_{DP}] t)$ with a second Hilbert transform into an imaginary signal $I_2 = \sin (2\pi [f_n+f_{DP}] t)$; and, multiplying $R_2 + jI_2 = \cos (2\pi [f_n+f_{DP}] t) + j \sin (2\pi [f_n+f_{DP}] t) = \Sigma e^{jwnt}$ by the complex conjugate of $R_1 + jI_1 = \cos (2\pi [f_{DR}+f_{DP}] t) + j \sin (2\pi [f_{DR}+f_{DP}] t) = \Sigma e^{jwot}$, thereby producing the signal $\Sigma e^{j(wn-wo)t}$, whereby the Doppler reference signal $f_{DR}$ and the Doppler signal $f_{DP}$ are stripped from the signal S to produce a periodic signal having the form of $\Sigma e^{j(wn-wo)t}$.

10. The method of claim 9 wherein $f_{DP}$ is approximately 605 Hz and said digital filtering step comprises low pass digital filtering to pass frequencies in the range of $605 \pm f_{DP}$ Hz.

11. The method of claim 10 further comprising the step of:
Fourier transforming said signal S to determine the frequencies $f_n$ present in S.

12. The method of claim 11 further comprising steps for locating boundaries between frames, said steps comprising:
sampling said signal S a total of m samples per frame;
generating the voltage difference function $D = S(m+x) - S(m)$ volts, wherein x is the sample point where the signal S begins to repeat itself within a single frame;
detecting when D is greater than a predetermining threshold voltage T, wherein T is substantially greater than zero; and
generating a frame boundary signal when the difference voltage D is greater than the threshold voltage T.

13. The method of claim 12 further comprising the step of:
classifying said signal S prior to said digital filtering step to determine if data is present in said signal S.

14. The method of claim 13 further comprising the step of:
frequency dividing said signal S prior to said classifying step in order to reduce the frequency of S.

15. The method of claim 14 further comprising the step of:
correcting said signal S for phase errors after said Fourier transforming step.

16. The method of claim 15 wherein said Fourier transforming step comprises a Fast Fourier Transform (FFT) step.

17. A method for demodulating a multiple tone signal S including a multiplicity of tones $f_n$ at least one of which is a constant 605 Hz Doppler reference tone and said signal S further includes a Doppler frequency shift $f_{DP}$, the method comprising the steps of:

low pass digital filtering said signal S so as to pass $f_{DP}$ and said 605 Hz Doppler reference tone;

transforming said signal passed from said low pass digital filtering step with a first Hilbert transform to produce a complex signal including said 605 Hz tone plus said Doppler frequency shift $f_{DP}$;

transforming said signal S with a second Hilbert transform to produce a complex signal including the Doppler frequency shift $f_{DP}$; and, multiplying the complex conjugate of the 605 Hz and the Doppler frequency shift $f_{DP}$ signal by the complex composite signal $f_n$ plus Doppler frequency shift $f_{DP}$ to produce an output signal substantially stripped of said Doppler frequency shift $f_{DP}$.

18. The method of claim 17 further including the step of:

classifying said signal S prior to said digitally filtering step to determine if data is present in said signal S.

19. A system for determining the location of frame boundaries in a complex periodic signal $S=\Sigma e^{jw}n^t$, wherein $w_n=2\pi f_n$ and $f_n$ is a plurality of frequencies which are separated by an integer multiple of a common frequency $f_c$, said system comprising:

function generating means for sampling said signal S a total of m samples per frame and generating the difference voltage function $D=S(m+x)-S(m)$, wherein x is the sample point where the periodic signal S begins to repeat itself within a single frame;

threshold detecting means for detecting when the difference voltage D is greater than a predetermined threshold voltage T, wherein T is substantially greater than zero; and, frame boundary generating means for generating a frame boundary signal when said threshold detecting means detects that the difference voltage D is greater than the threshold voltage T.

20. A method for determining frame boundary locations of a complex periodic signal $S=\Sigma e^{jw}n^t$, wherein $w_n=2\pi f_n$ and $f_n$ is a multiple of a common frequency $f_c$, said steps comprising:

sampling said complex signal S m times per frame and generating a plurality of first signals S(m);

generating a plurality of second signals $S(m+x)$, x samples later, wherein m is greater than x;

generating the difference voltage function $D=S(m+x)-S(m)$; and, setting a frame boundary whenever the difference voltage function $D=X(m+x)-S(m)$ is substantially greater than zero volts.

21. A system for demodulating a multiple tome signal S including a Doppler reference tone $f_{DR}$, a Doppler frequency shift $f_{DP}$ and a plurality of data tones at frequencies $f_n$ transmitted in frames, said system comprising:

a digital filter means for passing $f_{DR}$ and $f_{DP}$ and forming a real signal $R_1=\cos(2\pi [f_{DR}+f_{DP}] t)$;

first Hilbert transform means connected to said digital filter means for forming from $R_1$ an imaginary signal in the form of $I_1=\sin(2\pi [f_{DR}+f_{DP}] t)$;

storing means for storing $R_1$ and $I_1$;

second Hilbert transform means for transforming the real part $R_2$ of $S=\cos(2\pi [f_n+f_{DP}] t)$ into an imaginary signal having the form of $I_2=\sin(2\pi [f_n+f_{DP}] t)$; and, complex multiply means for multiplying $R_2+jI_2=\cos(2\pi [f_n+f_{DP}] t)+j\sin(2\pi [f_n+f_{DP}] t)=\Sigma e^{jwnt}$ by the complex conjugate of $R_1+jI_1=\cos(2\pi [f_{DR}+f_{DP}] t)+j\sin(2\pi [f_{DR}+f_{DP}] t)=\Sigma e^{wjot}$, thereby producing the signal $\Sigma e^{j(wn-wo)t}$, wherein the Doppler reference signal $f_{DR}$ and the Doppler frequency shift $f_{DP}$ are stripped from the signal S to produce a periodic signal having the form of $\Sigma e^{j(wn-wo)t}$.

22. A method for demodulating a multiple tone signal S including a Doppler reference signal $f_{DR}$, a Doppler frequency shift $f_{DP}$ and a plurality of data tones at frequencies $f_n$ transmitted in frames, said method comprising the steps of:

digitally filtering said signal S to pass $f_{DR}$ and $f_{DP}$ and form the real signal $R_1=\cos(2\pi [f_{DR}+f_{DP}] t)$;

transforming said signal $R_1$ with a first Hilbert transform into an imaginary signal $I_1=\sin(2\pi [f_{DR}+f_{DP}] t)$;

storing said signals $R_1$ and $I_1$;

transforming the real part $R_2$ of $S=\cos(2\pi [f_n+f_{DP}] t)$ with a second Hilbert transform into an imaginary signal $I_2=\sin(2\pi [f_n+f_{DP}] t)$; and, multiplying $R_2+jI_2=\cos(2\pi [f_n+f_{DP}] t)+j\sin(2\pi [f_n+f_{DP}] t)=\Sigma e^{jwnt}$ by the complex conjugate of $R_1+jI_1=\cos(2\pi [f_{DR}+f_{DP}] t)+j\sin(2\pi [f_{DR}+f_{DP}] t)=\Sigma e^{jwot}$, thereby producing the signal $\Sigma e^{j(wn-wo)t}$, whereby the Doppler reference signal $f_{DR}$ and the Doppler signal $f_{DP}$ are stripped from the signal S to produce a periodic signal having the form of $\Sigma e^{j(wn-wo)t}$.

* * * * *